United States Patent
Yan et al.

(10) Patent No.: US 11,303,713 B2
(45) Date of Patent: Apr. 12, 2022

(54) SYSTEMS AND METHODS FOR ON-DEMAND SERVICES

(71) Applicant: BEIJING DIDI INFINITY TECHNOLOGY AND DEVELOPMENT CO., LTD., Beijing (CN)

(72) Inventors: Xiaohui Yan, Beijing (CN); Chengxiang Zhuo, Beijing (CN); Jun Xie, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/060,234

(22) Filed: Oct. 1, 2020

(65) Prior Publication Data
US 2021/0021677 A1  Jan. 21, 2021

Related U.S. Application Data

(63) Continuation of application No. PCT/CN2018/081799, filed on Apr. 4, 2018.

(51) Int. Cl.
*G06F 15/16* (2006.01)
*H04L 67/52* (2022.01)
(Continued)

(52) U.S. Cl.
CPC .............. *H04L 67/18* (2013.01); *H04L 67/16* (2013.01); *H04W 4/029* (2018.02)

(58) Field of Classification Search
CPC .. G06Q 10/02; G06Q 10/047; G06Q 10/0833; G06Q 50/30; H04L 67/16; H04L 67/18; H04W 4/029
See application file for complete search history.

(56) References Cited

U.S. PATENT DOCUMENTS

| 2010/0223135 | A1* | 9/2010 | Griffin | G06Q 30/0261 |
| | | | | 705/14.58 |
| 2016/0066202 | A1* | 3/2016 | Dayanandan | H04W 72/0453 |
| | | | | 370/252 |

(Continued)

FOREIGN PATENT DOCUMENTS

| CN | 102957997 A | 3/2013 |
| CN | 104796856 A | 7/2015 |

(Continued)

OTHER PUBLICATIONS

International Search Report in PCT/CN2018/081799 dated Jan. 7, 2019, 4 pages.

(Continued)

*Primary Examiner* — Normin Abedin
(74) *Attorney, Agent, or Firm* — Metis IP LLC

(57) ABSTRACT

The present disclosure relates to systems and methods for providing online to offline services. The systems and methods may obtain a plurality of historical positions of a user terminal within a first predetermined time period in a plurality of days. The systems and methods may identify at least one candidate area based on the plurality of historical positions of the user terminal. The systems and methods may identify one or more of the at least one candidate areas as one or more active areas of the user terminal. The systems and methods may further provide data associated with one or more service requests relating to the one or more active areas to a customer application executed by the user terminal.

20 Claims, 11 Drawing Sheets

(51) Int. Cl.
*H04W 4/029* (2018.01)
*H04L 67/51* (2022.01)

(56) References Cited

U.S. PATENT DOCUMENTS

2018/0189717 A1\* 7/2018 Cao ..................... G06Q 10/083
2019/0007520 A1\* 1/2019 Lin ..................... H04L 41/5051

FOREIGN PATENT DOCUMENTS

| CN | 106779218 A | 5/2017 |
| CN | 107092629 A | 8/2017 |
| WO | 2015160375 A1 | 10/2015 |

OTHER PUBLICATIONS

Written Opinion in PCT/CN2018/081799 dated Jan. 7, 2019, 4 pages.

\* cited by examiner

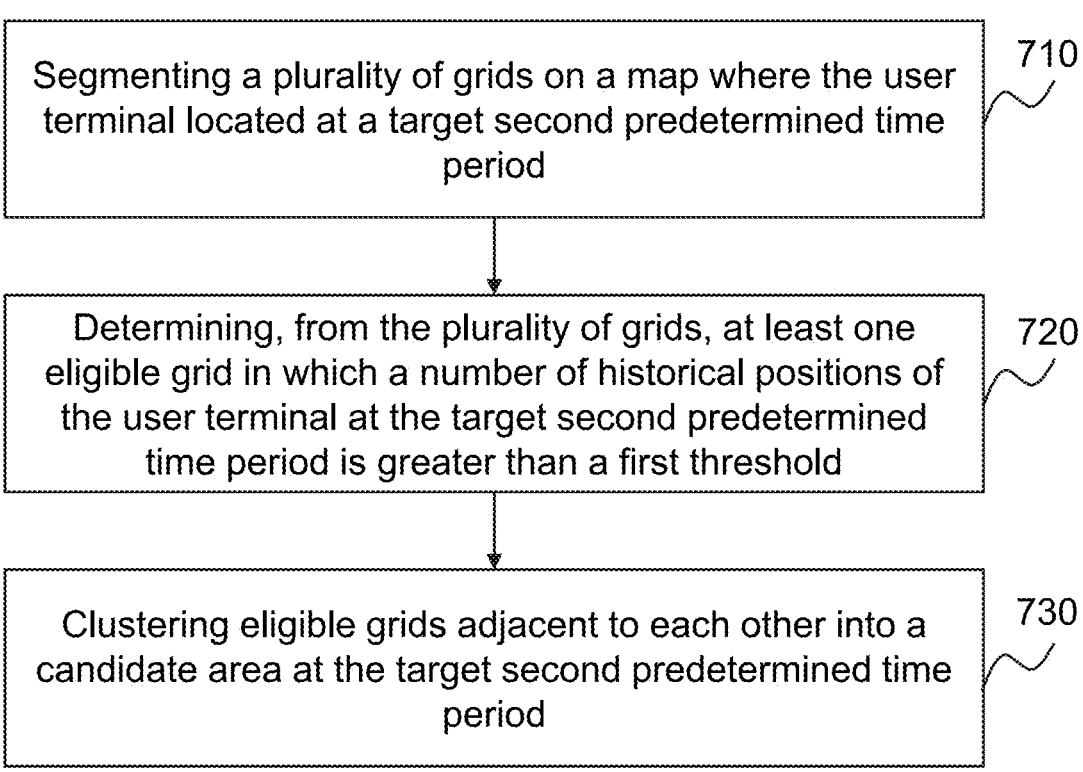
FIG. 7-A

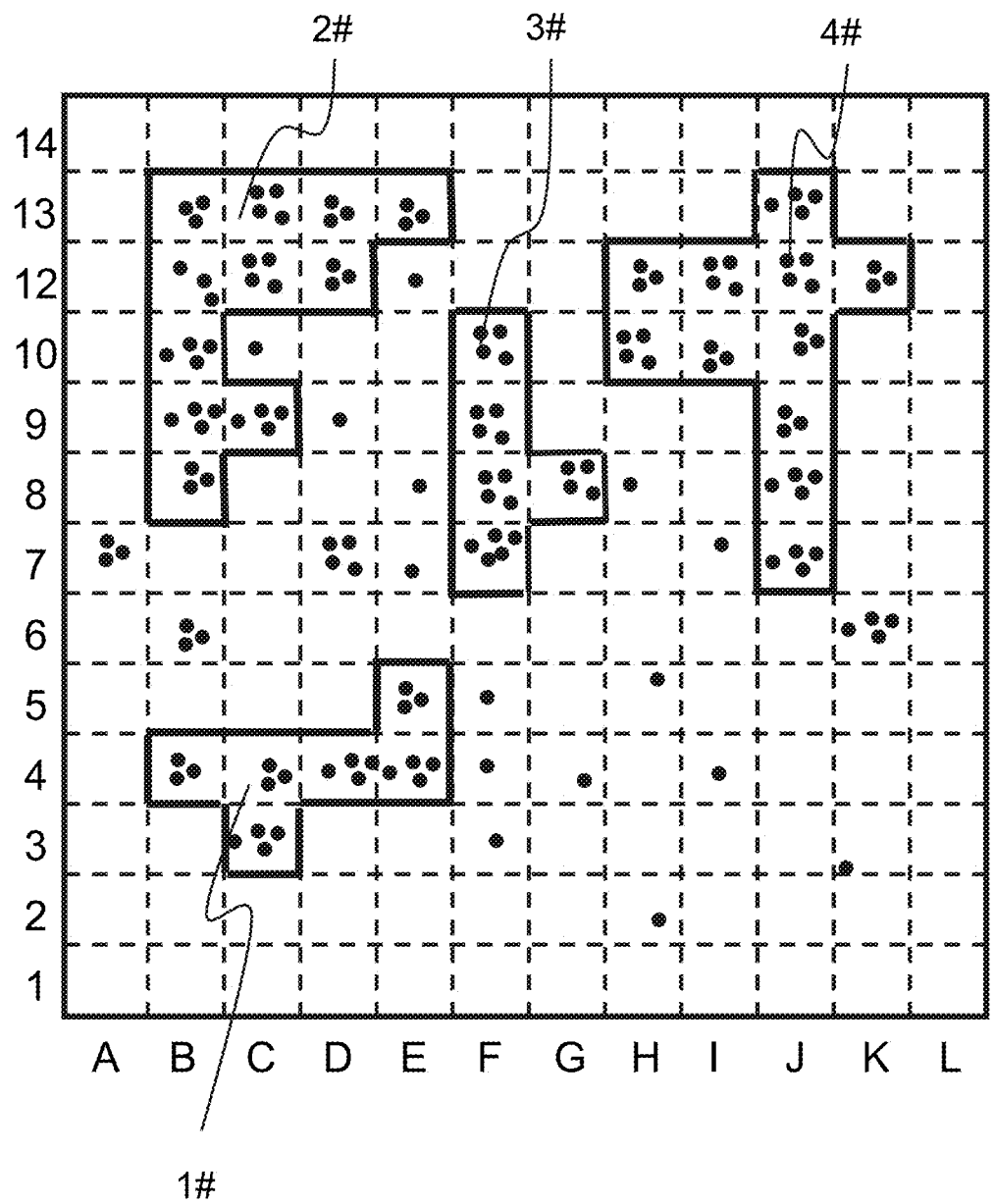
FIG. 7-B

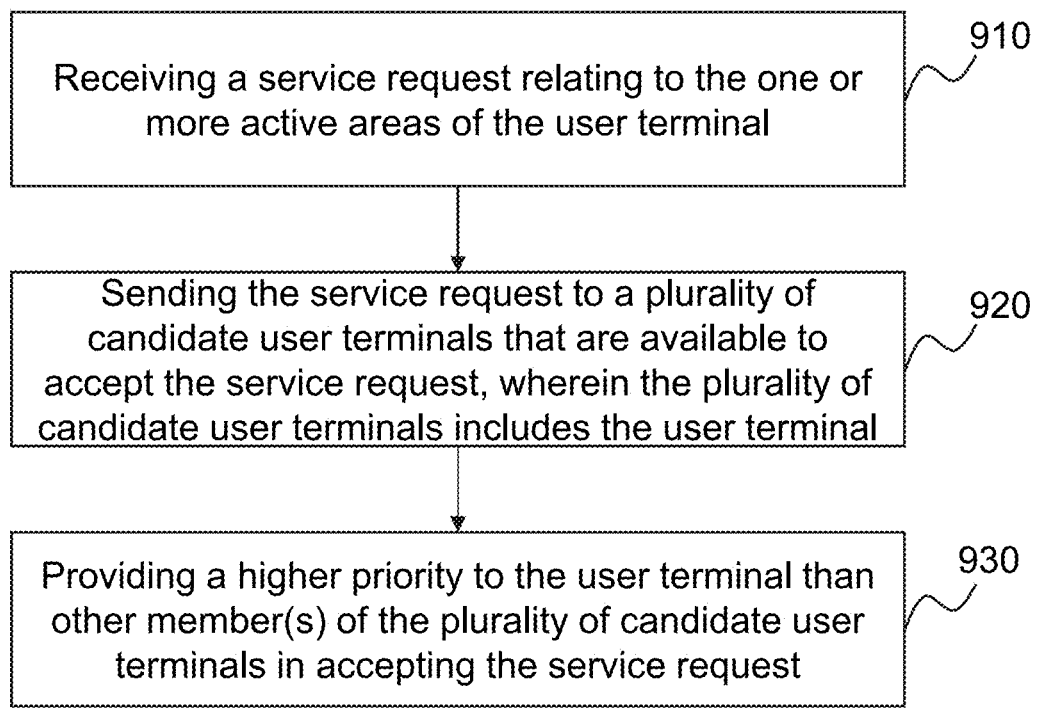
FIG. 9-A

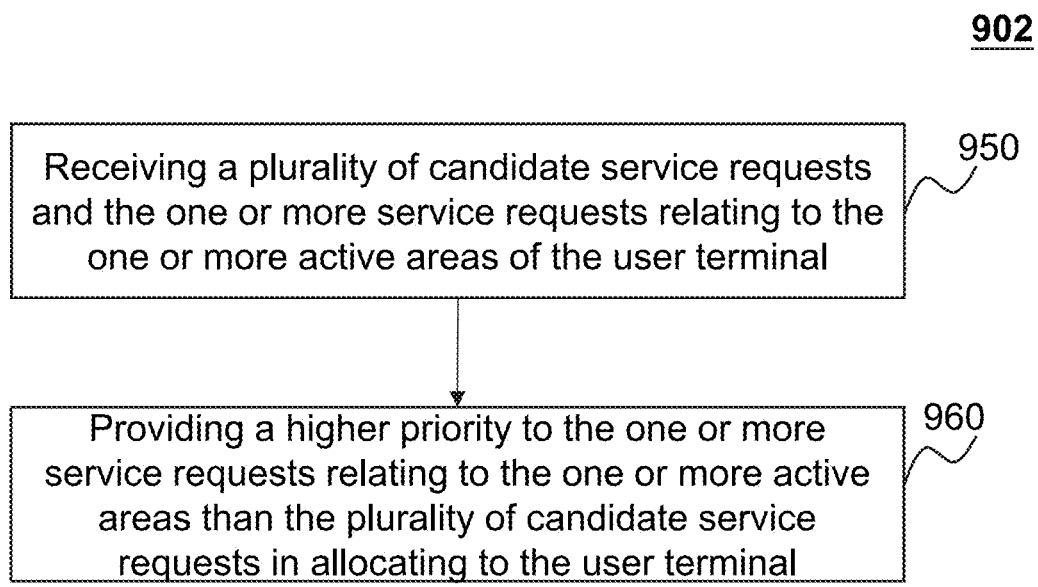
FIG. 9-B

SYSTEMS AND METHODS FOR ON-DEMAND SERVICES

CROSS-REFERENCE TO RELATED APPLICATIONS

This application is a continuation of International Application No. PCT/CN2018/081799, filed on Apr. 4, 2018, which designates the United States of America, the contents of which are incorporated herein by reference in their entirety.

TECHNICAL FIELD

The present disclosure generally relates to online to offline services, and in particular, relates to systems and methods for determining one or more active areas associated with a service provider.

BACKGROUND

Online to offline services utilizing Internet technology have become increasingly popular. Take on-demand transportation services (e.g., taxi hailing services) as an example, when a requestor initiates a service request, a system providing on-demand transportation services may send the service request to a plurality of service providers that are available to accept the service request. However, different service providers may have different preferences (e.g., an area preference). For a specific service provider, it may improve user experience to determine personalized active area(s) and accordingly, allocate service requests associated with the personalized active area(s) to the service provider.

SUMMARY

An aspect of the present disclosure relates to a system configured to provide online to offline service to a user. The system may include at least one storage medium including a set of instructions for providing online to offline service and at least one processor in communication with the at least one storage medium. When executing the set of instructions, the at least one processor may be directed to perform one or more of the following operations. The at least one processor may obtain a plurality of historical positions of a user terminal within a first predetermined time period in a plurality of days. The at least one processor may identify at least one candidate area based on the plurality of historical positions of the user terminal. The at least one processor may identify one or more of the at least one candidate areas as one or more active areas of the user terminal. The at least one processor may provide data associated with one or more service requests relating to the one or more active areas to a customer application executed by the user terminal.

Another aspect of the present disclosure relates to a method implemented on a computing device having at least one processor, at least one storage medium, and a communication platform connected to a network. The method may include one or more of the following operations. The at least one processor may obtain a plurality of historical positions of a user terminal within a first predetermined time period in a plurality of days. The at least one processor may identify at least one candidate area based on the plurality of historical positions of the user terminal. The at least one processor may identify one or more of the at least one candidate areas as one or more active areas of the user terminal. The at least one processor may provide data associated with one or more service requests relating to the one or more active areas to a customer application executed by the user terminal.

In some embodiments, the historical positions of the user terminal may vary with respect to time and the at least one candidate area also may vary with respect to time. The at least one processor may identify the one or more active areas of the user terminal corresponding to one or more active time periods. The at least one processor may provide the data associated with one or more service requests relating to the one or more active areas to the customer application executed by the user terminal based on the one or more active time periods.

In some embodiments, the user terminal may be associated with a service provider of a service. The service may include at least one of a taxi service, a carpooling service, and/or a hitch service.

In some embodiments, the at least one processor may divide the first predetermined time period into a plurality of second predetermined time periods. For each of the plurality of second predetermined time periods, the at least one processor may collect historical positions of the user terminal at the second predetermined time period and identify the at least one candidate area associated with the second predetermined time period.

In some embodiments, the at least one processor may cluster the historical positions of the user terminal at the target second predetermined time period to identify the at least one candidate area.

In some embodiments, the second predetermined time period may be 10 seconds, 30 seconds, 1 minutes, 10 minutes, and/or in a same scale of a position sampling period of the historical positions.

In some embodiments, the at least one processor may segment a plurality of grids on a map where the user terminal located in the target second predetermined time period. The at least one processor may determine, from the plurality of grids, at least one eligible grid in which a number of historical positions of the user terminal at the target second predetermined time period is greater than a first threshold. The at least one processor may cluster eligible grids adjacent to each other into a candidate area at the target second predetermined time period.

In some embodiments, the at least one processor may determine a position density of historical positions for each candidate area at the second predetermined time period for a second predetermined time period. The at least one processor may identify that of the at least one candidate area at the second predetermined time period with a position density greater than a second threshold as the one or more active areas of the user terminal at the second predetermined time period.

In some embodiments, the at least one processor may promote a priority of allocating the one or more service requests relating to the one or more active areas to the user terminal.

In some embodiments, each of the one or more service requests relating to the one or more active areas may include at least one of a start position of the service request located in the one or more active areas and/or a destination of the service request located in the one or more active areas.

In some embodiments, the at least one processor may receive the service request relating to the one or more active areas. The at least one processor may send the service request to a plurality of candidate user terminals that are available to accept the service request, wherein the plurality of candidate user terminals includes the user terminal. The at least one processor may provide a higher priority to the user terminal than other members of the plurality of candidate user terminals in accepting the service request.

In some embodiments, the at least one processor may receive a plurality of candidate service requests and the one or more service requests relating to the one or more active areas. The at least one processor may provide a higher priority to the one or more service requests relating to the one or more active areas than the plurality of candidate service requests in allocating to the user terminal.

A further aspect of the present disclosure relates to a non-transitory computer readable medium embodying a computer program product. The computer program product may include a set of instructions configured to cause a computing device to perform one or more of the following operations. The computing device may obtain a plurality of historical positions of a user terminal within a first predetermined time period in a plurality of days. The computing device may identify at least one candidate area based on the plurality of historical positions of the user terminal. The computing device may identify one or more of the at least one candidate areas as one or more active areas of the user terminal. The computing device may provide data associated with one or more service requests relating to the one or more active areas to a customer application executed by the user terminal.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 7-A is a flowchart illustrating an exemplary process for determining a candidate area at a predetermined time period according to some embodiments of the present disclosure;

FIG. 7-B is a schematic diagram illustrating exemplary candidate areas according to some embodiments of the present disclosure;

FIG. 9-A is a flowchart illustrating an exemplary process for promoting a priority of allocating service requests relating to one or more active areas to the user terminal according to some embodiments of the present disclosure; and FIG. 9-B is a flowchart illustrating an exemplary process for promoting a priority of allocating service requests relating to one or more active areas to the user terminal according to some embodiments of the present disclosure.

DETAILED DESCRIPTION

Figure 1:
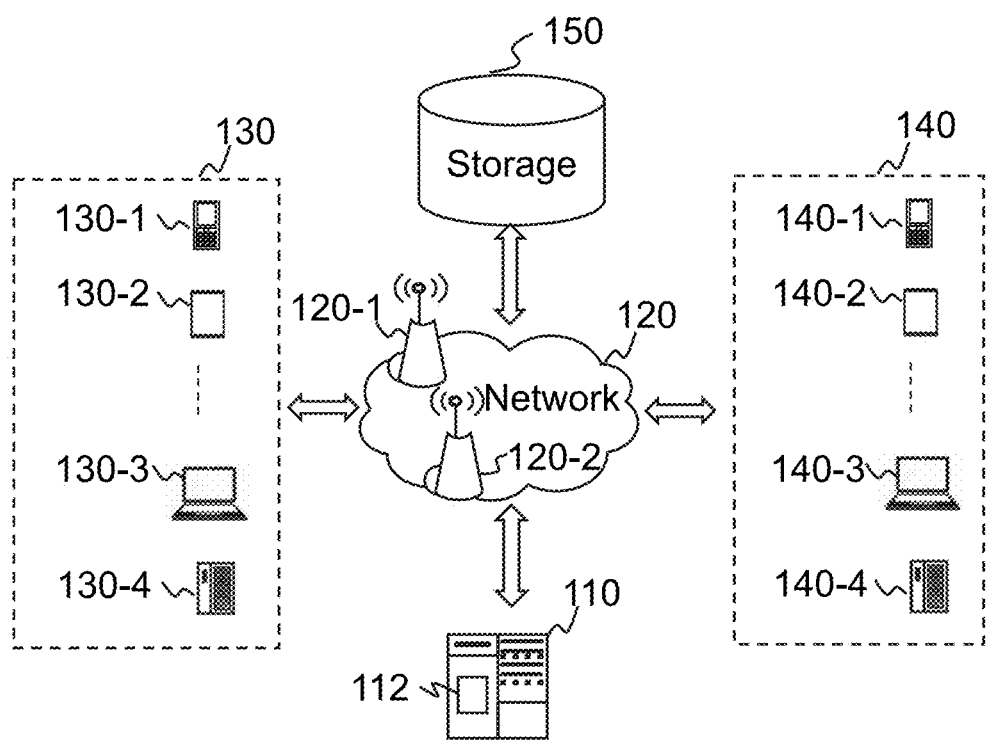
FIG. 1 is a schematic diagram illustrating an exemplary on-demand service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of steps, operations, elements, and/or components, but do not preclude the presence or addition of one or more other steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order or simultaneously. Moreover, one or more other operations may be added to the flowcharts. One or more operations may be removed from the flowcharts.

Moreover, while the systems and methods disclosed in the present disclosure are described primarily regarding on-demand transportation service, it should also be understood that this is only one exemplary embodiment. The system or method of the present disclosure may be applied to user of any other kind of on-demand service platform. For example, the system or method of the present disclosure may be applied to users in different transportation systems including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system that applies management and/or distribution, for example, a system for sending and/or receiving an express. The application scenarios of the system or method of the present disclosure may include a webpage, a plug-in of a browser, a client terminal, a custom system, an internal analysis system, an artificial intelligence robot, or the like, or any combination thereof.

The terms "passenger," "requestor," "service requestor," and "customer" in the present disclosure are used interchangeably to refer to an individual, an entity that may request or order a service. Also, the terms "driver," "provider," "service provider," and "supplier" in the present disclosure are used interchangeably to refer to an individual, an entity or a tool that may provide a service or facilitate the providing of the service. The term "user" in the present disclosure may refer to an individual, an entity that may request a service, order a service, provide a service, or facilitate the providing of the service. For example, the user may be a passenger, a driver, an operator, or the like, or any combination thereof. In the present disclosure, terms "passenger," "user equipment," "user terminal," and "passenger terminal" may be used interchangeably, and terms "driver" and "driver terminal" may be used interchangeably.

The terms "request," and "service request" in the present disclosure are used interchangeably to refer to a request that may be initiated by a passenger, a requestor, a service requestor, a customer, a driver, a provider, a service provider, a supplier, or the like, or any combination thereof. The service request may be accepted by any one of a passenger, a requestor, a service requestor, a customer, a driver, a provider, a service provider, or a supplier. The service request may be chargeable or free.

The positioning technology used in the present disclosure may include a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning technologies may be used interchangeably in the present disclosure.

An aspect of the present disclosure relates to systems and methods for determining one or more active areas associated with a service provider, such as a taxi driver. The active areas may indicate preferential areas where the service provider often stayed or often driven through at a current time or substantially the current time. To this end, the systems and methods may obtain historical records of the service provider (i.e., a smart phone of the taxi driver), which record time and positions of the individual service provider at certain time interval (e.g., 1 minute, 10 seconds, etc.) within a predetermined time period (e.g., 8:00 a.m.~8:00 p.m.) in a plurality of days (e.g., the last three months). Based on the records of time and positions of the service provider, for each time interval the systems and methods may further determine a plurality of candidate areas where the service provider statistically has higher probability to be at. For example, the systems and methods may perform a grid-based clustering operation on the historical positions to determine the plurality of candidate areas. Further, the systems and methods may select one or more active areas of the user terminal from the plurality of candidate areas based on, for example, position densities of the plurality of candidate areas at a specific time point. Accordingly, the active area is not only a custom-identified area for an individual service provider, but also an area that changes its shape and position with respect to time. The smaller the time interval is, the closer the active area to real-time. As the systems and methods have better prediction to where and when the individual service provider is during the predetermined time period, when a service request occurs at an active area of particular time, the systems and methods may give a higher priority to send the service request to the service provider.

It should be noted that online on-demand transportation service (e.g., online taxi hailing), is a new form of service rooted only in post-Internet era. It provides technical solutions to users (e.g., service requestors) and service providers (e.g., drivers) that could raise only in post-Internet era. In pre-Internet era, when a user hails a taxi on street, the taxi request and acceptance occur only between the passenger and one taxi driver that sees the passenger. If the passenger hails a taxi through a telephone call, the service request and acceptance may occur only between the passenger and one service provider (e.g., one taxi company or agent). Online taxi, however, allows a user of the service to automatically distribute a service request to a vast number of individual service providers (e.g., taxi) in distance away from the user in real time. It also allows a plurality of service providers to respond to the service request simultaneously and in real-time. Therefore, through the Internet, the online on-demand transportation systems may provide a much more efficient transaction platform for the users and the service providers that may never meet in a traditional pre-Internet transportation service system.

FIG. 1 is a schematic diagram illustrating an exemplary on-demand service system according to some embodiments of the present disclosure. In some embodiments, the on-demand service system may be a system for online to offline services. For example, the on-demand service system 100 may be an online transportation service platform for transportation services such as taxi hailing, chauffeur services, delivery vehicles, express car, carpool, bus service, driver hiring, shuttle services, etc. The on-demand service system 100 may be an online platform including a server 110, a network 120, a requestor terminal 130, a provider terminal 140, and a storage 150. The server 110 may include a processing engine 112.

In some embodiments, the server 110 may be a single server, or a server group. The server group may be centralized, or distributed (e.g., server 110 may be a distributed system). In some embodiments, the server 110 may be local or remote. For example, the server 110 may access information and/or data stored in the one or more user terminals (e.g., the one or more requestor terminals 130, provider terminals 140), and/or the storage 150 via the network 120. As another example, the server 110 may be directly connected to the one or more user terminals (e.g., the one or more requestor terminals 130, provider terminals 140), and/or the storage 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the service request to perform one or more functions of the server 110 description in the present disclosure. For example, the processing engine 112 may obtain a plurality of historical positions of a user terminal within a predetermined time period in a plurality of days and determine one or more active areas associated with the user terminal based on the plurality of historical positions. In some embodiments, the processing engine 112 may include one or more processing engines (e.g., signal-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components of the on-demand service system 110 (e.g., the server 110, the one or more requestor terminals 130, provider terminals 140, or the storage 150) may transmit information and/data to other component(s) of the on-demand service system 100 via the network 120. For example, the server 110 may receive a service request from the requestor terminal 130 via the network 120. In some embodiments, the network 120 may be any type of wired or wireless network, or any combination thereof. Merely by way of example, the network 120 may include a cable network, a wireline network, an optical fiber network, a tele communications network, an intranet, an internet, a local area network (LAN), a wide area network (WAN), a wireless local area network (WLAN), a metropolitan area network (MAN), a wide area network (WAN), a public telephone switched network (PTSN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information between them.

In some embodiments, a service requestor may be a user of the requestor terminal 130. In some embodiments, the user of the requestor terminal 130 may be someone other than the service requestor. For example, a user A of the requestor terminal 130 may use the requestor terminal 130 to send a service request for a user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may use the provider terminal 140 to receive a service request for a user D, and/or information or instructions from the server 110. In some embodiments, "requestor" and "requestor terminal" may be used interchangeably, and "provider" and "provider terminal" may be used interchangeably.

In some embodiments, the requestor terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, the built-in device in the motor vehicle 130-4 may include an onboard computer, an onboard television, etc. In some embodiments, the requestor terminal 130 may be a device with positioning technology for locating the position of the service requestor and/or the requestor terminal 130.

In some embodiments, the provider terminal 140 may be similar to, or the same device as the requestor terminal 130. In some embodiments, the provider terminal 140 may be a device with positioning technology for locating the position of the driver and/or the provider terminal 140. In some embodiments, the requestor terminal 130 and/or the provider terminal 140 may communicate with other positioning device to determine the position of the service requestor, the requestor terminal 130, the driver, and/or the provider terminal 140. In some embodiments, the requestor terminal 130 and/or the provider terminal 140 may send positioning information to the server 110.

The storage 150 may store data and/or instructions. In some embodiments, the storage 150 may store data obtained from the one or more user terminals (e.g., the one or more passenger terminals 130, provider terminals 140). In some embodiments, the storage 150 may store data and/or instructions that the server 110 may execute or use to perform exemplary methods described in the present disclosure. In some embodiments, the storage 150 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 120 to communicate with one or more components of the on-demand service system 100 (e.g., the server 110, the requestor terminal 130, the provider terminal 140). One or more components of the on-demand service system 100 may access the data and/or instructions stored in the storage 150 via the network 120. In some embodiments, the storage 150 may be directly connected to or communicate with one or more components of the on-demand service system 100 (e.g., the server 110, the requestor terminal 130, the provider terminal 140). In some embodiments, the storage 150 may be part of the server 110.

In some embodiments, one or more components of the on-demand service system 100 (e.g., the server 110, the requestor terminal 130, the provider terminal 140) may access the storage 150. In some embodiments, one or more components of the on-demand service system 100 may read and/or modify information relating to the service requestor, provider, and/or the public when one or more conditions are met. For example, the server 110 may read and/or modify one or more users' information after a service. As another example, the provider terminal 140 may access information relating to the service requestor when receiving a service request from the requestor terminal 130, but the provider terminal 140 may not modify the relevant information of the service requestor.

In some embodiments, information exchanging of one or more components of the on-demand service system 100 may be achieved by way of requesting a service. The object of the service request may be any product. In some embodiments, the product may be a tangible product, or immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used on the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle), a car (e.g., a taxi, a bus, a private car), a train, a subway, a vessel, an aircraft (e.g., an airplane, a helicopter, a space shuttle, a rocket, a hot-air balloon), or the like, or any combination thereof.

One of ordinary skill in the art would understand that when an element of the on-demand service system 100 performs, the element may perform through electrical signals and/or electromagnetic signals. For example, when a requestor terminal 130 processes a task, such as making a determination, identifying or selecting an object, the requestor terminal 130 may operate logic circuits in its processor to process such task. When the requestor terminal 130 sends out a service request to the server 110, a processor of the service requestor terminal 130 may generate electrical signals encoding the service request. The processor of the requestor terminal 130 may then send the electrical signals to an output port. If the requestor terminal 130 communicates with the server 110 via a wired network, the output port may be physically connected to a cable, which may further transmit the electrical signals to an input port of the server 110. If the requestor terminal 130 communicates with the server 110 via a wireless network, the output port of the requestor terminal 130 may be one or more antennas, which may convert the electrical signals to electromagnetic signals. Similarly, a provider terminal 140 may process a task through operation of logic circuits in its processor, and receive an instruction and/or service request from the server 110 via electrical signals or electromagnet signals. Within an electronic device, such as the requestor terminal 130, the provider terminal 140, and/or the server 110, when a processor thereof processes an instruction, sends out an instruction, and/or performs an action, the instruction and/or action is conducted via electrical signals. For example, when the processor retrieves or saves data from a storage medium (e.g., the storage 150), it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 2:
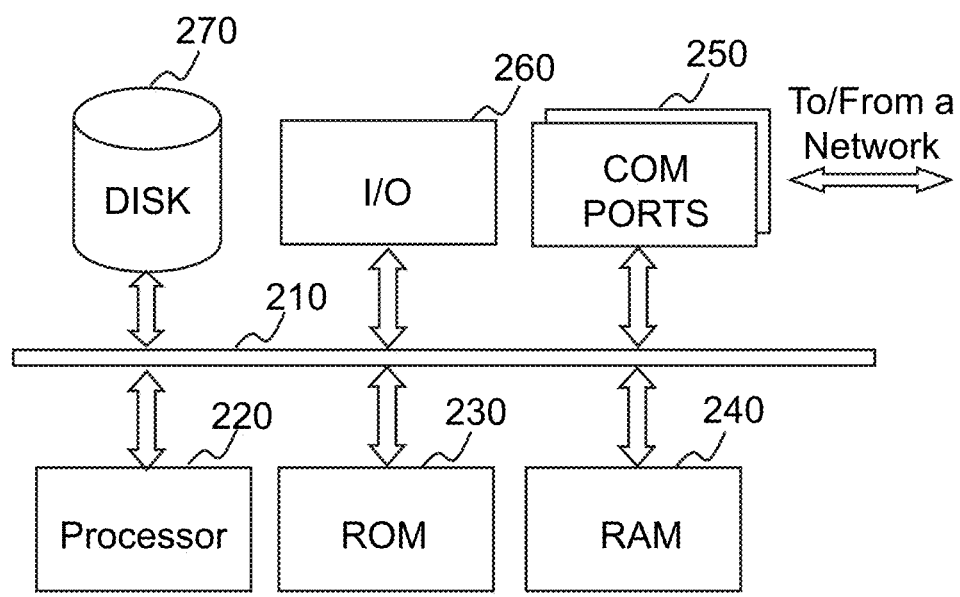
FIG. 2 is a schematic diagram illustrating exemplary hardware and/or software components of an exemplary computing device according to some embodiments of the present disclosure.

FIG. 2 is a schematic diagram illustrating exemplary hardware and software components of a computing device 200 on which the server 110, the requestor terminals 130, or the provider terminals 140 may be implemented according to some embodiments of the present disclosure. For example, the processing engine 112 may be implemented on the computing device 200 and configured to perform functions of the processing engine 112 disclosed in this disclosure.

The computing device 200 may be used to implement any component of the on-demand service system 100 as described herein. For example, the processing engine 112 may be implemented on the computing device 200, via its hardware, software program, firmware, or a combination thereof. Although only one such computer is shown, for convenience, the computer functions relating to the on-demand service as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., a processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The exemplary computing device may include an internal communication bus 210, program storage and data storage of different forms including, for example, a disk 270, and a read only memory (ROM) 230, or a random access memory (RAM) 240, for various data files to be processed and/or transmitted by the computing device. The exemplary computer platform may also include program instructions stored in the ROM 230, RAM 240, and/or other type of non-transitory storage medium to be executed by the processor 220. The methods and/or processes of the present disclosure may be implemented as the program instructions. The computing device 200 also includes an I/O component 260, supporting input/output between the computer and other components therein such as user interface elements 280. The computing device 200 may also receive programming and data via network communications.

Merely for illustration, only one processor is described in FIG. 2. Multiple processors are also contemplated, thus operations and/or method steps performed by one processor as described in the present disclosure may also be jointly or separately performed by the multiple processors. For example, if in the present disclosure the processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
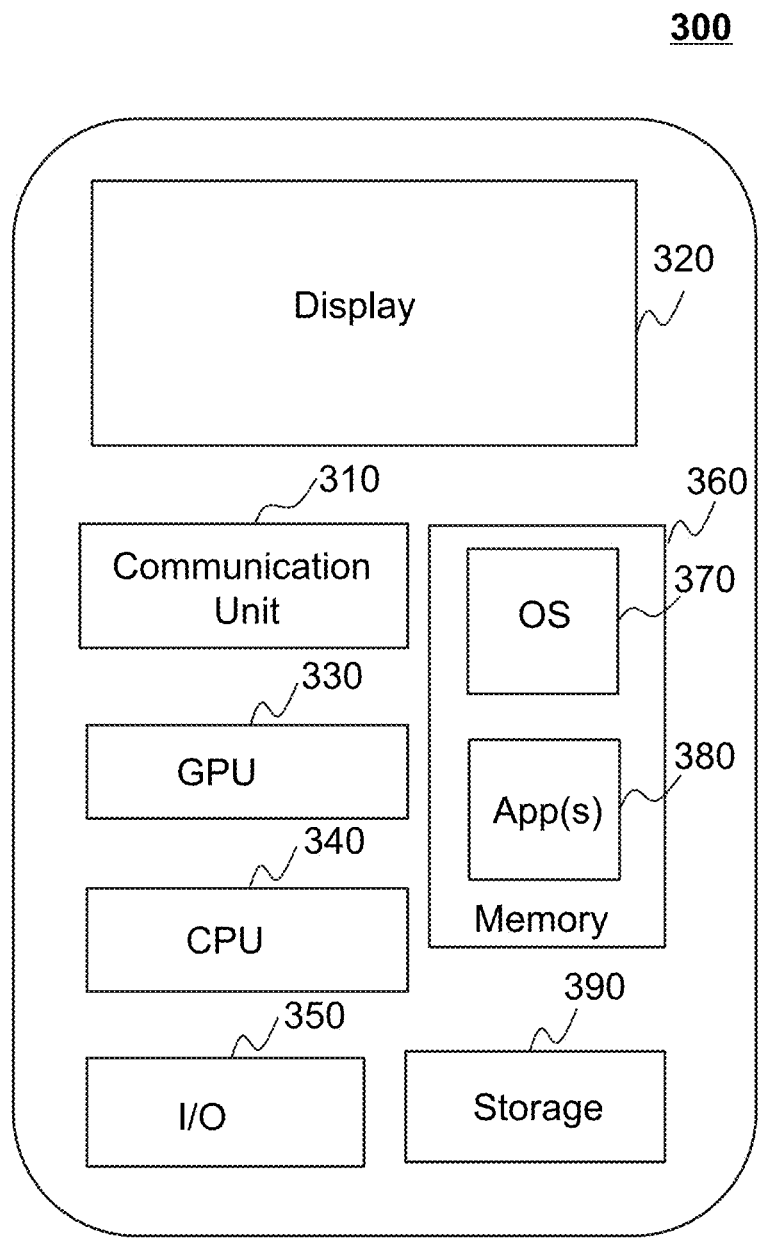
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device 300 on which the requester terminal 130 or the provider terminal 140 may be implemented according to some embodiments of the present disclosure. As illustrated in FIG. 3, the mobile device 300 may include a communication unit 310, a display 320, a graphic processing unit (GPU) 330, a central processing unit (CPU) 340, an I/O 350, a memory 360, and a storage 390. The CPU 340 may include interface circuits and processing circuits similar to the processor 220. In some embodiments, any other suitable component, including but not limited to a system bus or a controller (not shown), may also be included in the mobile device 300. In some embodiments, a mobile operating system (OS) 370 (e.g., iOS™, Android™, Windows Phone™, etc.) and one or more application(s) 380 may be loaded into the memory 360 from the storage 390 in order to be executed by the CPU 340. The application(s) 380 may include a browser or any other suitable mobile apps for receiving and rendering information relating to a service request or other information from the location based service providing system on the mobile device 300. User interactions with the information stream may be achieved via the I/O devices 350 and provided to the processing engine 112 and/or other components of the system 100 via the network 150.

Figure 4:
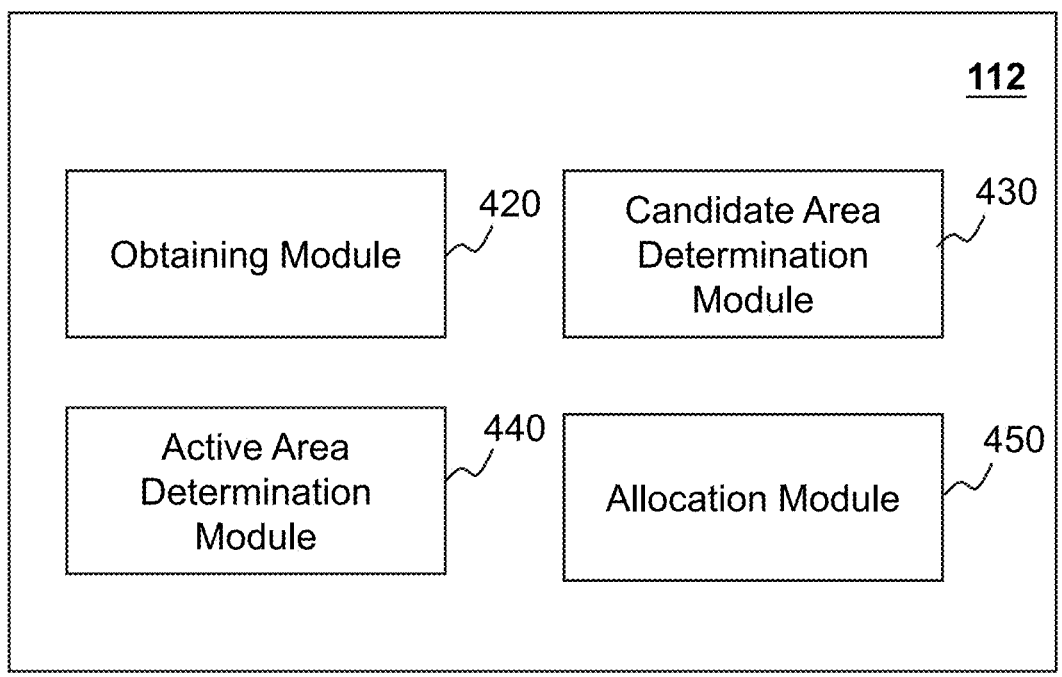
FIG. 4 is a block diagram illustrating an exemplary processing engine according to some embodiments of the present disclosure.

FIG. 4 is a block diagram illustrating an exemplary processing engine 112 according to some embodiments of the present disclosure. The processing engine 112 may include an obtaining module 420, a candidate area determination module 430, an active area determination module 440, and an allocation module 450.

The obtaining module 420 may be configured to obtain a plurality of historical positions of a user terminal (e.g., the provider terminal 140) within a first predetermined time period (e.g., 8:00 a.m.~8:00 p.m.) in a plurality of days (e.g., the last three months, the last six months). The obtaining module 420 may obtain the plurality of historical positions from a storage device (e.g., the storage 150) disclosed elsewhere in the present disclosure. In some embodiments, the obtaining module 420 may obtain the plurality of historical positions from historical records (e.g., historical orders, historical trips without providing services) associated with the user terminal. For example, when the user terminal is logged in the system 100, the system 100 may obtain position information (e.g., GPS information) of the user terminal which indicates a current location of the user terminal from the user terminal (i.e., the provider terminal) periodically (e.g., per second, per 5 seconds, per 10 seconds) or in real time. Further, the system 100 may store the position information a storage device (e.g., the storage 150) disclosed elsewhere in the present disclosure.

The candidate area determination module 430 may be configured to identify at least one candidate area based on the historical positions of the user terminal. For example, the candidate area determination module 430 may perform a grid-based clustering operation on the historical positions of the user terminal and determine at least one cluster based on the clustering operation (e.g., see FIGS. 7-A and 7-B and the descriptions thereof). The candidate area determination module 430 may further determine the at least one candidate based on the at least one cluster.

The active area determination module 440 may be configured to identify one or more of the at least one candidate area as one or more active areas of the user terminal. For example, the active area determination module 440 may select the one or more active areas from the at least one candidate area based on a position density of the at least one candidate area.

The allocation module 450 may be configured to allocate service requests to provider terminal(s) 140. For example, the allocation module 450 may provide data associated with one or more service requests relating to the one or more active areas to a customer application executed by the user terminal. In some embodiments, the allocation module 450 may promote a priority of allocating service requests relating to the one or more active areas to the user terminal. For example, the allocation module 450 may promote a priority of allocating a service request of which a start position or a destination is in the vicinity of the one or more active areas to the user terminal. As used herein, "in the vicinity" refers to that a distance between the start position or the destination and one of the one or more active areas is less than a distance threshold (e.g., 500 m, 1 km, 2 km).

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the candidate area determination module 430 and the active area determination module 440 may be combined as a single module which may obtain determine the candidate area and the active area. As another example, the processing engine 112 may include a storage module (not shown) used to store information and/or data associated with the user terminal (e.g., the historical position information).

Figure 5:
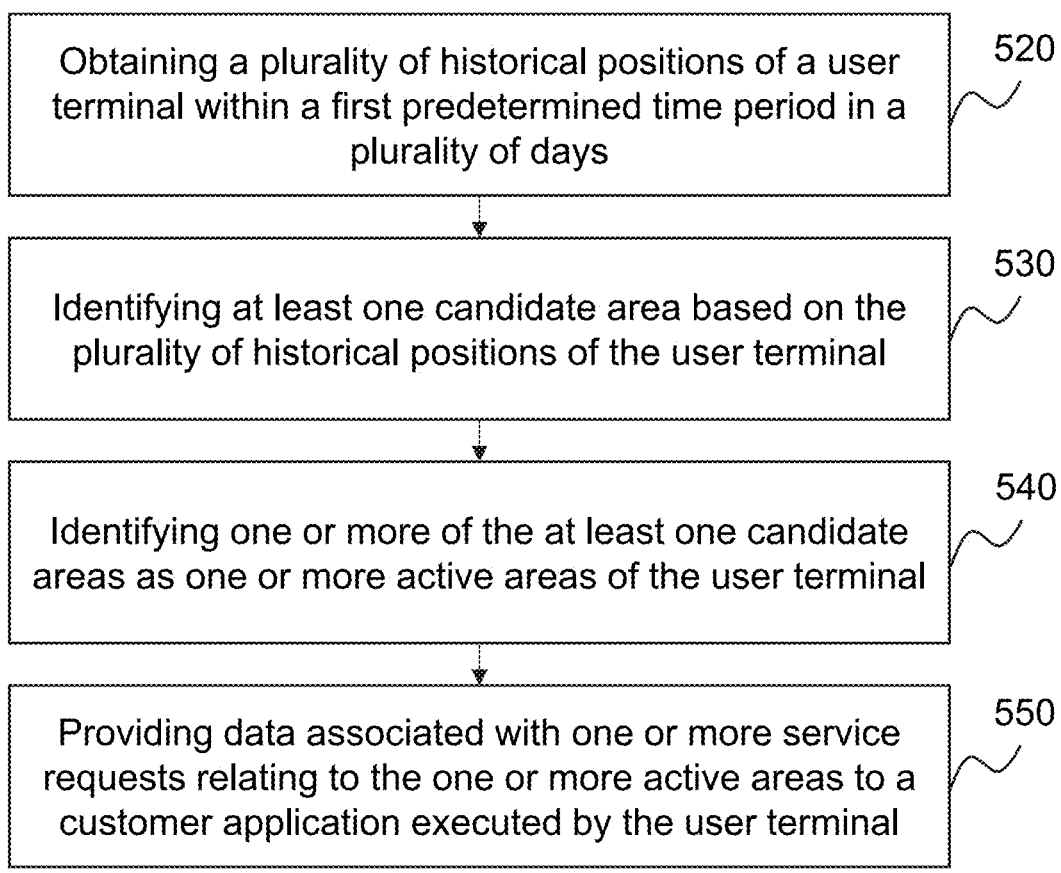
FIG. 5 is a flowchart illustrating an exemplary process for providing data associated with one or more service requests relating to one or more active areas to a user terminal according to some embodiments of the present disclosure.

FIG. 5 is a flowchart illustrating an exemplary process for providing data associated with one or more service requests relating to the one or more active areas to a user terminal according to some embodiments of the present disclosure. The process 500 may be executed by the on-demand service system 100. For example, the process 500 may be implemented as a set of instructions stored in the storage ROM 230 or RAM 240. The processor 220 and/or the modules in FIG. 4 may execute the set of instructions, and when executing the instructions, the processor 220 and/or the modules may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process 500 as illustrated in FIG. 5 and described below is not intended to be limiting.

In step 520, the processing engine 112 (e.g., the obtaining module 420) (e.g., the interface circuits of the processor 220) may obtain a plurality of historical positions of an individual user terminal within a first predetermined time period in a plurality of days (e.g., the last three months, the last six months). The processing engine 112 may obtain the plurality of historical positions of the user terminal from a storage device (e.g., the storage 150) disclosed elsewhere in the present disclosure. In some embodiments, the first predetermined time period may be a time period during a day.

The first predetermined time period may be default settings of the on-demand service system 100, or may be adjustable under different situations. For example, the first predetermined time period may be a defined time period (e.g., 8:00 a.m.~8:00 p.m., 9:00 a.m.~8:00 p.m., 10:00 a.m.~6:00 p.m.). As another example, the first predetermined time period may be a working time period (i.e., a time period from an earliest time point when the service provider logged in the system to a latest time point when the service provider logged out of the system during a day) of the service provider during a day.

In some embodiments, the processing engine 112 may obtain the plurality of historical positions from historical records (e.g., historical orders, historical trips without providing services) associated with the user terminal. Take a specific historical record of the individual user terminal as an example, during a historical trip of the user terminal, the processing engine 112 may obtain position information (e.g., GPS information) of the user terminal which indicates a current location of the user terminal from the user terminal (i.e., the provider terminal 140) at a certain time interval (e.g., 1 second, 10 seconds, 1 minutes, etc.), in real time or substantially in real-time. Further, the processing engine 112 may store the position information in a storage device (e.g., the storage 150) disclosed elsewhere in the present disclosure.

In step 530, the processing engine 112 (e.g., the candidate area determination module 430) (e.g., the processing circuits of the processor 220) may identify at least one candidate area based on the historical positions of the user terminal. For example, the processing engine 112 may perform a clustering operation (e.g., a grid-based clustering operation) on the historical positions of the user terminal and determine at least one cluster based on the clustering operation (e.g., see FIGS. 7-A and 7-B and the descriptions thereof). The processing engine 112 may further determine the at least one candidate based on the at least one cluster.

In step 540, the processing engine 112 (e.g., the active area determination module 440) (e.g., the processing circuits of the processor 220) may identify one or more of the at least one candidate area as one or more active areas of the user terminal. For example, the processing engine 112 may select the one or more active areas from the at least one candidate area based on a position density of the at least one candidate area.

In some embodiments, as described above, the historical positions of the user terminal is specifically for the individual user terminal and vary with respect to time. Consequently, the at least one candidate area varies with respect to time for the specific individual user terminal as well. The processing engine 112 may identify the one or more active areas of the user terminal corresponding to one or more active time periods (i.e., the time interval described above) (e.g., see, FIG. 6, FIG. 8, and the descriptions thereof). As used herein, the active area is an area that changes its shape and position with respect to time. The smaller the time interval is, the closer the active area to real-time.

In step 550, the processing engine 112 (e.g., the allocation module 450) (e.g., the interface circuits of the processor 220) may provide data associated with one or more service requests relating to the one or more active areas to a customer application (e.g., a taxi-hailing application) executed by the user terminal. In some embodiments, the processing engine 112 may promote a priority of allocating the one or more service requests relating to the one or more active areas to the user terminal. For example, the processing engine 112 may promote a priority of allocating a service request of which a start position or a destination is in the vicinity of the one or more active areas to the user terminal. As used herein, "in the vicinity" refers to that a distance between the start position or the destination and one of the one or more active areas is less than a distance threshold (e.g., 500 m, 1 km, 2 km). In some embodiments, the processing engine 112 may promote the priority of allocating the one or more service requests relating to the one or more active areas to the user terminal based on the one or more active time periods. For example, for a specific active time period (e.g., 9:00 a.m.~9:01 a.m.), the processing engine 112 may identify a corresponding active area and promote the priority of allocating service requests relating to the active time period and the active area to the user terminal.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process 500. In the storing step, the processing engine 112 may store information and/or data associated with the historical records in a storage device (e.g., the storage 150) disclosed elsewhere in the present disclosure.

Figure 6:
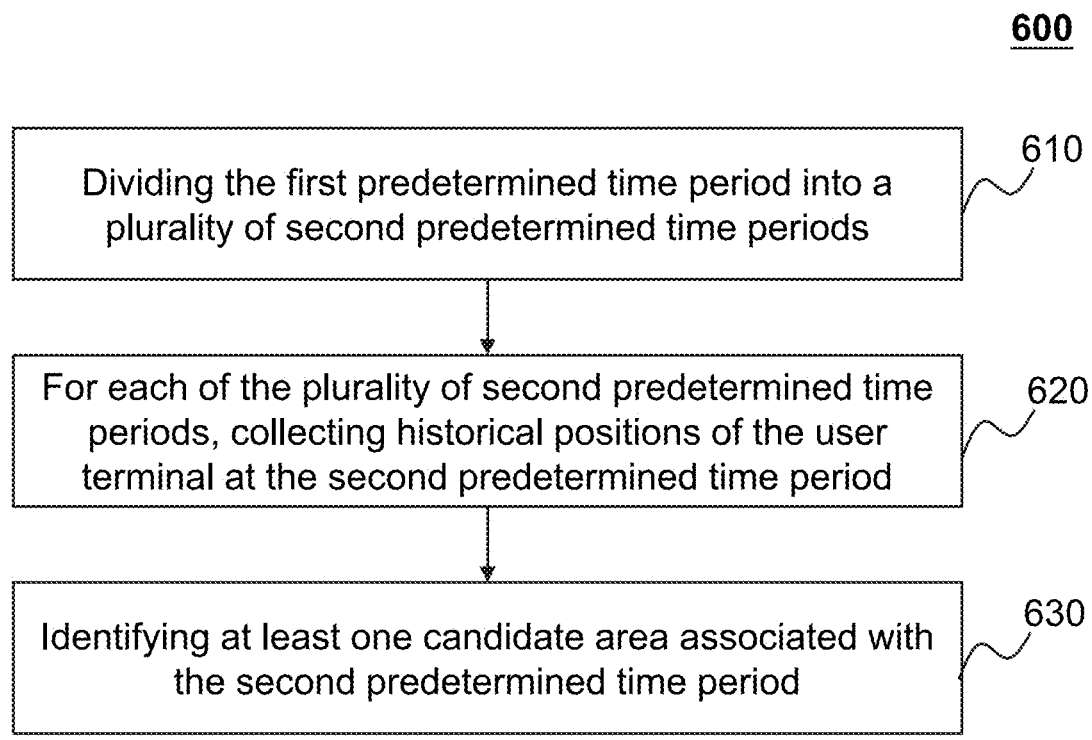
FIG. 6 is a flowchart illustrating an exemplary process for determining at least one candidate area associated with a predetermined time period according to some embodiments of the present disclosure.

FIG. 6 is a flowchart illustrating an exemplary process for determining at least one candidate area associated with a second predetermined time period according to some embodiments of the present disclosure. The process 600 may be executed by the on-demand service system 100. For example, the process 600 may be implemented as a set of instructions stored in the storage ROM 230 or RAM 240. The processor 220 and/or the modules in FIG. 4 may execute the set of instructions, and when executing the instructions, the processor 220 and/or the modules may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process 600 as illustrated in FIG. 6 and described below is not intended to be limiting. In some embodiments, step 530 of process 500 may be performed based on process 600.

In step 610, the processing engine 112 (e.g., the candidate area determination module 430) (e.g., the processing circuits of the processor 220) may divide the first predetermined time period into a plurality of second predetermined time periods (i.e., active time periods). The plurality of second predetermined time periods may be default settings of the on-demand service system 100, or may be adjustable under different situations. For example, the second predetermined time period may be 10 seconds, 30 seconds, 1 minute, 5 minutes, 10 minutes, 30 minutes, 1 hour, or in a same scale of a position sampling period of the historical positions. In some embodiments, the plurality of second predetermined time periods may be the same with or different from each other.

In step 620, for each of the plurality of second predetermined time periods, the processing engine 112 (e.g., the candidate area determination module 430) (e.g., the processing circuits of the processor 220) may collect historical positions of the user terminal at the second predetermined time period. As described in connection with step 520, the processing engine 112 may obtain the historical positions of the user terminal at the second predetermined time period from a storage device (e.g., the storage 150) disclosed elsewhere in the present disclosure.

In step 630, the processing engine 112 (e.g., the candidate area determination module 430) (e.g., the processing circuits of the processor 220) may identify at least one candidate area associated with the second predetermined time period. Take a specific second predetermined time period as an example, the processing engine 112 may determine a plurality of grids on a map where the user terminal located and select one or more grids in which a number of historical positions is larger than a threshold. Further, the processing engine 112 may identify the at least one candidate area associated with the second predetermined time period based on the one or more grids (e.g., see, FIGS. 7-A and 7-B and the description thereof).

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, step 620 and step 630 may be combined as a single step in which the processing engine 112 may both collect historical positions of the user terminal at each of the plurality of second predetermined time periods and identify the at least one candidate area associated with the second predetermined time period based on the historical positions.

FIG. 7-A is a flowchart illustrating an exemplary process for determining one or more candidate areas at a target second predetermined time period according to some embodiments of the present disclosure. The process 700 may be executed by the on-demand service system 100. For example, the process 700 may be implemented as a set of instructions stored in the storage ROM 230 or RAM 240. The processor 220 and/or the modules in FIG. 4 may execute the set of instructions, and when executing the instructions, the processor 220 and/or the modules may be configured to perform the process 700. The operations of the illustrated process presented below are intended to be illustrative. In some embodiments, the process 700 may be accomplished with one or more additional operations not described and/or without one or more of the operations discussed. Additionally, the order in which the operations of the process 700 as illustrated in FIG. 7 and described below is not intended to be limiting. In some embodiments, step 530 and/or step 630 of process 600 may be performed based on process 700.

In step 710, the processing engine 112 (e.g., the candidate area determination module 430) (e.g., the processing circuits of the processor 220) may segment a plurality of grids on a map where the user terminal located in a target second predetermined time period.

In some embodiments, the processing engine 112 may segment the plurality of grids based on a segmentation parameter. The segmentation parameter may be default settings of the on-demand service system 100, or may be adjustable under different situations. The segmentation parameter may include a size of a grid, a population density in a region (e.g., a city, a district) corresponding to the map, a building density in the region, etc. The sizes of the plurality of grids may be the same with or different from each other. The shape of each of the plurality of grids may include a rectangle, a triangle, a circle, an irregular polygon, etc. For example, the processing engine 112 may segment a plurality of grids with a size of 100 m×100 m, 200 m×200 m, 500 m×500 m, etc.

In step 720, the processing engine 112 (e.g., the candidate area determination module 430) (e.g., the processing circuits of the processor 220) may determine at least one eligible grid in which a number of historical positions of the user terminal at the target second predetermined time period is greater than a first threshold.

The first threshold may be default settings of the on-demand service system 100, or may be adjustable under different situations. In some embodiments, the first threshold may be a value that corresponds to a predetermined percentage (e.g., 1%, 2%, 3%, 5%, 10%) in a sum of historical positions in the plurality of grids. For example, it is assumed that the sum of historical positions in the plurality of grids is 1000, the predetermined percentage is 3%, in this situation, the first threshold may be 1000×3%=30.

In step 730, the processing engine 112 (e.g., the candidate area determination module 430) (e.g., the processing circuits of the processor 220) may cluster eligible grids adjacent to each other into a candidate area at the target second predetermined time period. As used herein, "a grid M adjacent to a grid N" refers to that a part of a boundary X corresponding to the grid M is in contact with a part of a boundary Y corresponding to the grid N (e.g., grid B4 and grid C4 illustrated in FIG. 7-B).

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process 700. In the storing step, the processing engine 112 may store information and/or data associated with the plurality of grids (e.g., a number of the plurality of grids, sizes of the plurality of grids) in a storage device (e.g., the storage 150) disclosed elsewhere in the present disclosure.

FIG. 7-B is a schematic diagram illustrating exemplary candidate areas according to some embodiments of the present disclosure. As illustrated, the processing engine 112 may segment the map into 12×14 grids with the same size and the same shape. Black dots refer to the historical positions of the user terminal at the target second predetermined time period. The processing engine 112 may determine, from the plurality of grids, one or more eligible grids in which the number of historical positions of the user terminal at the target second predetermined time period is greater that the first threshold (e.g., 3). The processing engine 112 may further cluster eligible grids adjacent to each other into a candidate area at the target second predetermined time period. For example, eligible grids C3, B4, C4, D4, E4, and E5 are adjacent to each other and the processing engine 112 may cluster these eligible grids into a candidate area 1 #. Similarly, the processing engine 112 may also determine candidate areas 2 #, 3 #, and 4 #.

Figure 8:
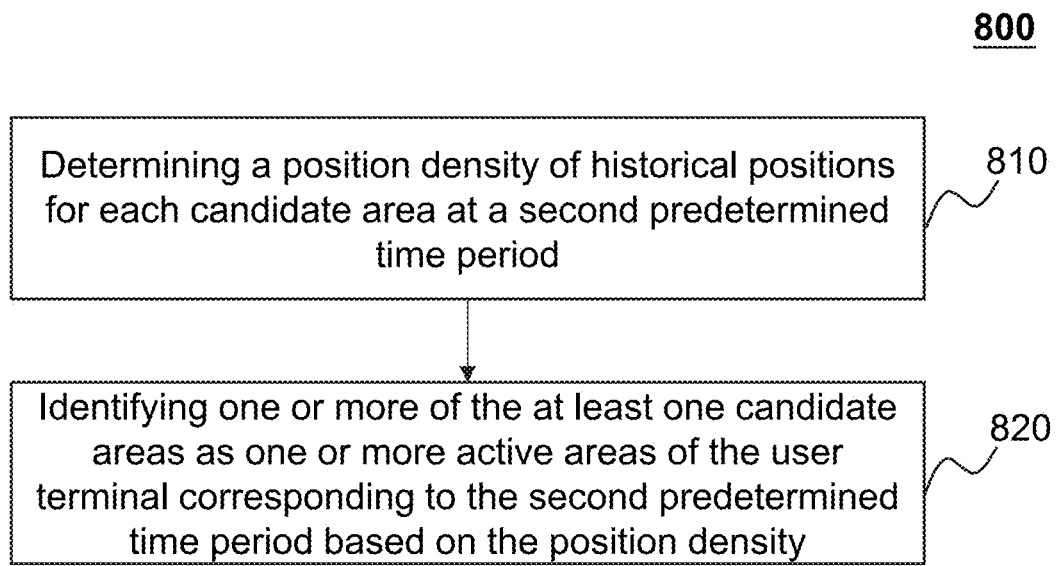
FIG. 8 is a flowchart illustrating an exemplary process for determining one or more active areas according to some embodiments of the present disclosure.

FIG. 8 is a flowchart illustrating an exemplary process for determining one or more active areas of the user terminal according to some embodiments of the present disclosure. The process 800 may be executed by the on-demand service system 100. For example, the process 800 may be implemented as a set of instructions stored in storage ROM 230 or RAM 240. The processor 220 and/or the modules in FIG. 4 may execute the set of instructions, and when executing the instructions, the processor 220 and/or the modules may be configured to perform the process 800. The operations of the illustrated process presented below are intended to be illustrative. In some embodiments, the process 800 may be accomplished with one or more additional operations not described and/or without one or more of the operations discussed. Additionally, the order in which the operations of the process 800 as illustrated in FIG. 8 and described below is not intended to be limiting. In some embodiments, step 540 and/or step 630 of process 500 may be performed based on the process 800.

In step 810, as described in connection with step 540 and/or step 610, the processing engine 112 (e.g., the active area determination module 440) (e.g., the processing circuits of the processor 220) may determine a position density of historical positions for each candidate area at a second predetermined time period.

Take a specific candidate area as an example, the processing engine 112 may determine the position density of the candidate area according to formula (1) below:

$$d_i = \frac{N_i}{S_i} \quad (1)$$

where $d_i$ refers to the position density of candidate area i, $N_i$ refers to a number of historical positions in the candidate area i, and $S_i$ refers to an area of the candidate area i.

In step 820, the processing engine 112 (e.g., the active area determination module 440) (e.g., the processing circuits of the processor 220) may identify one or more of the at least one candidate areas as the one or more active areas of the user terminal at the second predetermined time period based on the position density.

In some embodiments, for each candidate area, the processing engine 112 may determine whether the position density is larger than a second threshold. In response to the determination that the position density is larger than the second threshold, the processing engine 112 may determine the candidate area as an active area. The second threshold may be default settings of the on-demand service system 100, or may be adjustable under different situations.

In some embodiments, it is assumed that a plurality of candidate areas were determined, the processing engine 112 may rank the plurality of candidate areas based on a plurality of position densities corresponding to the plurality of candidate areas. The processing engine 112 may further identify one or more active areas (e.g., top 1, top 2, top 5, top 10, top 1%, top 5%, top 10%, top 30%) from the plurality of candidate areas based on the ranking result.

After determining the one or more active areas, the processing engine 112 may mark the one or more active areas by one or more coordinates within the active areas. Take a specific active area as an example, the processing engine 112 may mark the specific active area by a longitude coordinate and a latitude coordinate of a center location of an eligible grid with a largest position density in the active area. As another example, the processing engine 112 may fit the specific active area into a circular region and mark the active area by a longitude coordinate and a latitude coordinate of a center location of the circular region.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 9-A and FIG. 9-B are flowcharts illustrating an exemplary process for promoting a priority of allocating service requests relating to one or more active areas to the user terminal according to some embodiments of the present disclosure. The process 901 and/or the process 902 may be executed by the on-demand service system 100. For example, the process 901 and/or the process 902 may be implemented as a set of instructions stored in storage ROM 230 or RAM 240. The processor 220 and/or the modules in FIG. 4 may execute the set of instructions, and when executing the instructions, the processor 220 and/or the modules may be configured to perform the process 901 and/or the process 902. The operations of the illustrated process presented below are intended to be illustrative. In some embodiments, the process 901 and/or the process 902 may be accomplished with one or more additional operations not described and/or without one or more of the operations discussed. Additionally, the order in which the operations of the process 901 and/or the process 902 as illustrated in FIG. 9-A and FIG. 9-B and described below is not intended to be limiting. In some embodiments, step 550 of process 500 may be performed based on the process 901 and/or the process 902.

In step 910, the processing engine 112 (e.g., the allocation module 450) (e.g., the interface circuits of the processor 220) may receive a service request relating to the one or more active areas of the user terminal. The processing engine 112 may receive the service request from the requestor terminal 130 via the network 120.

In some embodiments, the service request may be a request for a transportation service (e.g., a taxi service, a carpooling service, a hitch service). The service request may include a start position, a destination, a start time, etc. The start position or the destination may be located in the one or more active areas. The service request may further include a passenger identity (e.g., a telephone number, a terminal identity associated with the requestor terminal 130, a nick name).

In step 920, the processing engine 112 (e.g., the allocation module 450) (e.g., the interface circuits of the processor 220) may send the service request to a plurality of candidate user terminals that are available to accept the service request, wherein the plurality of candidate user terminals includes the user terminal corresponding to the one or more active areas. As used herein, an "available user terminal" refers to that a service provider corresponding to the user terminal is within a predetermined distance (e.g., 2 km) from the start position and can provide the transportation service at the start time of the service request.

In some embodiments, the processing engine 112 may send the service request to the plurality of candidate user terminals in the form of text, audio, graph, video, or the like, or any combination thereof. For example, the processing engine 112 may send a text message, a voice message, or a video message associated with the service request to the plurality of candidate user terminals.

In step 930, the processing engine 112 (e.g., the allocation module 450) (e.g., the processing circuits of the processor 220) may provide a higher priority to the user terminal than other member(s) of the plurality of candidate user terminals in accepting the service request. For example, the processing engine 112 may send the service request to the user terminal earlier than to other member(s) by a predetermined time period (e.g., 2 seconds, 5 seconds). As another example, it is assumed that the user terminal and other member(s) accept the service request at the same (or substantially same) time, the processing engine 112 may allocate the service request to the user terminal.

In step 950, the processing engine 112 (e.g., the allocation module 450) (e.g., the interface circuits of the processor 220) may receive a plurality of candidate service requests and the one or more service requests relating to the one or more active areas of the user terminal. As used herein, for each of the plurality of candidate service requests, the start position is within a predetermined range (e.g., 500 m, 1 km, 1.5 km, 2 km) of a location of the user terminal.

In step 960, the processing engine 112 (e.g., the allocation module 450) (e.g., the interface circuits of the processor 220) may provide a higher priority to the one or more service requests relating to the one or more active areas than the plurality of candidate service requests in allocating to the user terminal. For example, the processing engine 112 may allocate the one or more service requests relating to the one or more active areas to the user terminal earlier than the plurality of candidate service requests by a predetermined time period (e.g., 1 second, 2 seconds, 5 seconds).

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, it is assumed that the user terminal is not available (i.e., the user terminal does not log in the system) at the present moment, the processing engine 112 may send an off-line message (e.g., a short message) associated with the service request to the user terminal.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python, or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system configured to provide online to offline service to a user, comprising:
   at least one storage medium including a set of instructions for providing online to offline service; and
   at least one processor in communication with the at least one storage medium, wherein when executing the set of instructions, the at least one processor is directed to:
      obtain a plurality of historical positions of a user terminal within a first predetermined time period in a plurality of days;
      identify at least one candidate area based on the plurality of historical positions of the user terminal, wherein to identify the at least one candidate area based on the plurality of historical positions of the user terminal, the at least one processor is directed to:
         segment a plurality of grids on a map where the user terminal located in the first predetermined time period;
         determine, from the plurality of grids, at least one eligible grid in which a number count of historical positions of the user terminal within the first predetermined time period is greater than a count threshold; and
         cluster eligible grids adjacent to each other into the at least one candidate area; and
      identify one or more of the at least one candidate area as one or more active areas of the user terminal; and
      provide data associated with one or more service requests relating to the one or more active areas to a customer application executed by the user terminal.

2. The system of claim 1, wherein the historical positions of the user terminal vary with respect to time;
   the at least one candidate area varies with respect to time;
   the at least one processor is directed to identify the one or more active areas of the user terminal corresponding to one or more active time periods; and
   the at least one processor is directed to provide the data associated with the one or more service requests relating to the one or more active areas to the customer application executed by the user terminal based on the one or more active time periods.

3. The system of claim 2, wherein to identify the at least one candidate area based on the historical positions of the user terminal, the at least one processor is further directed to:
   divide the first predetermined time period into a plurality of second predetermined time periods; and
   for each of the plurality of second predetermined time periods:
      collect historical positions of the user terminal within the second predetermined time period; and
      identify at least one candidate area associated with the second predetermined time period.

4. The system of claim 3, wherein the second predetermined time period is 10 seconds, 30 seconds, 1 minutes, 10 minutes, or in a same scale of a position sampling period of the historical positions.

5. The system of claim 3, wherein to identify the at least one candidate area associated with the second predetermined time period, the at least one processor is further directed to:
   identify the at least one candidate area by clustering the historical positions of the user terminal within the second predetermined time period.

6. The system of claim 3, wherein to identify the one or more active areas of the user terminal corresponding to the one or more active time periods, the at least one processor is further directed to:
   for each of the plurality of second predetermined time periods, determine a position density of historical positions for each candidate area within the second predetermined time period; and
   identify one or more of the at least one candidate area within the second predetermined time period with a position density greater than a second threshold as the one or more active areas of the user terminal within the second predetermined time period.

7. The system of claim 1, wherein the user terminal is associated with a service provider of a service, the service including at least one of a taxi service, a carpooling service, or a hitch service.

8. The system of claim 1, wherein the at least one processor is further directed to:
   promote a priority of allocating the one or more service requests relating to the one or more active areas to the user terminal.

9. The system of claim 8, wherein each of the one or more service requests relating to the one or more active areas includes at least one of a start position of the service request located in the one or more active areas or a destination of the service request located in the one or more active areas; and to promote the priority of allocating the one or more service requests relating to the one or more active areas to the user terminal, the at least one processor is further directed to:
receive a service request relating to the one or more active areas;
send the service request to a plurality of candidate user terminals that are available to accept the service request, wherein the plurality of candidate user terminals includes the user terminal; and
provide a higher priority to the user terminal than other members of the plurality of candidate user terminals in accepting the service request.

10. The system of claim 8, wherein to promote the priority of allocating the one or more service requests relating to the one or more active areas to the user terminal, the at least one processor is further directed to:
receive a plurality of candidate service requests and the one or more service requests relating to the one or more active areas; and
provide a higher priority to the one or more service requests relating to the one or more active areas than the plurality of candidate service requests in allocating to the user terminal.

11. A method implemented on a computing device having at least one processor, at least one storage medium, and a communication platform connected to a network, the method comprising:
obtaining a plurality of historical positions of a user terminal within a first predetermined time period in a plurality of days;
identifying at least one candidate area based on the plurality of historical positions of the user terminal, wherein the identifying the at least one candidate area based on the plurality of historical positions of the user terminal comprises:
segmenting a plurality of grids on a map where the user terminal located in the first predetermined time period;
determining, from the plurality of grids, at least one eligible grid in which a number count of historical positions of the user terminal within the first predetermined time period is greater than a count threshold; and
clustering eligible grids adjacent to each other into the at least one candidate area; and
identifying one or more of the at least one candidate area as one or more active areas of the user terminal; and
providing data associated with one or more service requests relating to the one or more active areas to a customer application executed by the user terminal.

12. The method of claim 11, wherein the historical positions of the user terminal vary with respect to time;
the at least one candidate area varies with respect to time;
the method further includes:
identifying the one or more active areas of the user terminal corresponding to one or more active time periods; and
providing the data associated with the one or more service requests relating to the one or more active areas to the customer application executed by the user terminal based on the one or more active time periods.

13. The method of claim 12, wherein the identifying of the at least one candidate area based on the historical positions of the user terminal includes:
dividing the first predetermined time period into a plurality of second predetermined time periods; and
for each of the plurality of second predetermined time periods:
collecting historical positions of the user terminal within the second predetermined time period; and
identifying at least one candidate area associated with the second predetermined time period.

14. The method of claim 13, wherein the second predetermined time period is 10 seconds, 30 seconds, 1 minutes, 10 minutes, or in a same scale of a position sampling period of the historical positions.

15. The method of claim 13, wherein the identifying of the at least one candidate area associated with the second predetermined time period includes:
identifying the at least one candidate area by clustering the historical positions of the user terminal within the second predetermined time period.

16. The method of claim 13, wherein the identifying of the one or more active areas of the user terminal corresponding to the one or more active time periods includes:
for each of the plurality of second predetermined time periods, determining a position density of historical positions for each candidate area within the second predetermined time period; and
identifying one or more of the at least one candidate area within the second predetermined time period with a position density greater than a second threshold as the one or more active areas of the user terminal within the second predetermined time period.

17. The method of claim 11, wherein the user terminal is associated with a service provider of a service, the service including at least one of a taxi service, a carpooling service, or a hitch service.

18. The method of claim 11, wherein the method further includes:
promoting a priority of allocating the one or more service requests relating to the one or more active areas to the user terminal.

19. The method of claim 18, wherein each of the one or more service requests relating to the one or more active areas includes at least one of a start position of the service request located in the one or more active areas or a destination of the service request located in the one or more active areas; and
the promoting the priority of allocating the one or more service requests relating to the one or more active areas to the user terminal includes:
receiving a service request relating to the one or more active areas;
sending the service request to a plurality of candidate user terminals that are available to accept the service request, wherein the plurality of candidate user terminals includes the user terminal; and
providing a higher priority to the user terminal than other members of the plurality of candidate user terminals in accepting the service request.

20. The system of claim 18, wherein the promoting the priority of allocating the one or more service requests relating to the one or more active areas to the user terminal includes:
receiving a plurality of candidate service requests and the one or more service requests relating to the one or more active areas; and
providing a higher priority to the one or more service requests relating to the one or more active areas than the plurality of candidate service requests in allocating to the user terminal.

* * * * *